United States Patent
Kale et al.

(10) Patent No.: US 7,917,265 B2
(45) Date of Patent: Mar. 29, 2011

(54) SYSTEM FOR AUTOMATED EXCAVATION CONTROL BASED ON PRODUCTIVITY

(75) Inventors: Satish L. Kale, Lemont, IL (US); Richard G. Ingram, St. Charles, IL (US); Kevin J. Sergott, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 974 days.

(21) Appl. No.: 11/700,191

(22) Filed: Jan. 31, 2007

(65) Prior Publication Data

US 2008/0183356 A1 Jul. 31, 2008

(51) Int. Cl.
G06F 7/70 (2006.01)

(52) U.S. Cl. .................................................. 701/50

(58) Field of Classification Search .................. None
See application file for complete search history.

(56) References Cited

U.S. PATENT DOCUMENTS

| | | | |
|---|---|---|---|
| 3,497,014 A | 2/1970 | Ask | |
| 3,957,121 A | 5/1976 | Takeda | |
| 4,053,018 A | 10/1977 | Takeda | |
| 4,194,574 A * | 3/1980 | Benson et al. | 172/430 |
| 4,282,933 A | 8/1981 | Suganami et al. | |
| 4,423,785 A | 1/1984 | Kurihara et al. | |
| 4,630,685 A * | 12/1986 | Huck et al. | 172/7 |
| 4,907,653 A | 3/1990 | Bellanger et al. | |
| 4,918,608 A | 4/1990 | Middleton et al. | |
| 5,220,968 A * | 6/1993 | Weber | 177/25.14 |
| 5,235,511 A | 8/1993 | Middleton et al. | |
| 5,463,852 A | 11/1995 | O'Halloran et al. | |
| 5,752,333 A | 5/1998 | Nakagawa et al. | |
| 5,815,826 A * | 9/1998 | Henderson et al. | 701/50 |
| 6,181,999 B1 * | 1/2001 | Yamamoto et al. | 701/50 |
| 6,205,687 B1 * | 3/2001 | Rocke | 37/348 |
| 6,208,925 B1 * | 3/2001 | Creger et al. | 701/51 |
| 6,211,471 B1 * | 4/2001 | Rocke et al. | 177/136 |
| 6,317,676 B1 | 11/2001 | Gengler et al. | |
| 6,427,107 B1 * | 7/2002 | Chiu et al. | 701/50 |
| 6,845,311 B1 * | 1/2005 | Stratton et al. | 701/50 |
| 7,574,821 B2 * | 8/2009 | Furem | 37/348 |
| 2004/0117092 A1 * | 6/2004 | Budde | 701/50 |

* cited by examiner

Primary Examiner — Khoi Tran
Assistant Examiner — Bhavesh V Amin
(74) Attorney, Agent, or Firm — Finnegan, Henderson, Farabow, Garrett & Dunner LLP

(57) ABSTRACT

A control system for a mobile excavation machine is disclosed. The control system may have a ground engaging work tool, a sensor, and a controller. The sensor may be configured to sense a parameter indicative of a current travel speed of the mobile excavation machine and generate a speed signal in response thereto. The controller may be in communication with the ground engaging work tool and the sensor, and configured to receive the signal. The controller may also be configured to determine an amount of material currently being moved by the work tool and calculate a current productivity value associated with removal of the material based on the speed signal and the determined amount of material currently being moved. The controller may be further configured to control the ground engaging work tool to vary the amount of material currently being moved in response to the current productivity value.

20 Claims, 4 Drawing Sheets

SYSTEM FOR AUTOMATED EXCAVATION CONTROL BASED ON PRODUCTIVITY

TECHNICAL FIELD

The present disclosure relates generally to an automated machine control system and, more particularly, to a system for automatically calculating instantaneous productivity and controlling a machine's excavation in response thereto.

BACKGROUND

Machines such as, for example, dozers, motor graders, wheel loaders, and other types of heavy equipment are used to perform a variety of earth-moving tasks. Some of these tasks requiring removal of large amounts of material can be difficult for an unskilled or inexperienced operator to achieve efficiently. For example, an unskilled operator may attempt to remove a maximum amount of material during each excavation pass, but may only be able to do so at a very slow speed. Another unskilled operator may attempt to travel quickly, but may only be able to move a very small amount of material during each excavation pass at that speed. Finding the most productive combination of load and travel speed can be complicated, especially when manually performed by an inexperienced operator. Poor productivity and low efficiency can be costly to a machine owner. Because of these factors, the completion of some tasks by a completely operator-controlled machine can be expensive, labor intensive, time consuming, and inefficient.

One method of improving the operation of a machine under such conditions is described in U.S. Pat. No. 4,423,785 (the '785 patent) issued to Kurihara et al. on Jan. 3, 1984. The '785 patent describes a load control device for a working tool of a construction vehicle. The load control device is programmed with an effective traction power versus vehicle speed curve that is associated with the particular construction vehicle and working tool. From this curve, the load control device selects a maximum productivity point having a corresponding travel speed and drive force. The travel speed and drive force are then made desired values used to automatically control operation of the construction machine. As the construction vehicle moves about a worksite and is exposed to accelerations and decelerations associated with changes in terrain, the desired values are modified. By targeting the maximum productivity point, operation of the construction machine may be improved.

Although the construction machine of the '785 patent may be capable of improving machine productivity, its use may be limited. That is, because control of the construction machine is based on a predefined curve associated with only one new machine and a single work tool configuration for that machine, the curve's accuracy may hinge on the machine's configuration and capacity remaining unchanged. And, for the same reason, the control strategy may be inapplicable to other machines or other work tool configurations having a different output capacity or to an older machine with diminished capacity.

The disclosed system is directed to overcoming one or more of the problems set forth above.

SUMMARY OF THE INVENTION

In one aspect, the present disclosure is directed to a control system for a mobile excavation machine. The control system may include a ground engaging work tool, a sensor, and a controller. The sensor may be configured to sense a parameter indicative of a current travel speed of the mobile excavation machine and generate a speed signal in response thereto. The controller may be in communication with the ground engaging work tool and the sensor, and configured to receive the signal. The controller may also be configured to determine an amount of material currently being moved by the work tool and calculate a current productivity value associated with removal of the material based on the speed signal and the determined amount of material currently being moved. The controller may be further configured to control the ground engaging work tool to vary the amount of material currently being moved in response to the current productivity value.

In yet another aspect, the present disclosure is directed to a method of controlling machine operation. The method may include determining a current machine travel speed, and determining an amount of material currently being excavated. The method may also include calculating a current productivity value based on the current machine travel speed and the determined amount of material currently being excavated. The method may further include varying the amount of material currently being excavated in response to the current productivity value.

DETAILED DESCRIPTION

Figure 1:
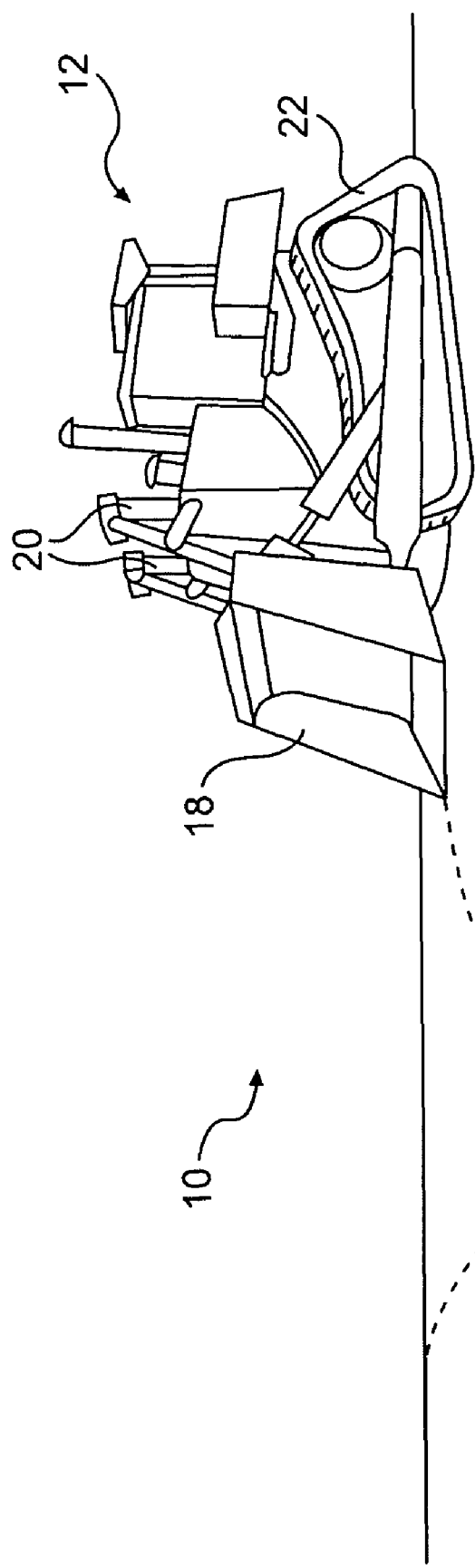
FIG. 1 is a pictorial illustration of an exemplary disclosed machine operating at a worksite.

FIG. 1 illustrates a worksite 10 with an exemplary machine 12 performing a predetermined task. Worksite 10 may include, for example, a mine site, a landfill, a quarry, a construction site, or any other type of worksite. The predetermined task may be associated with altering the current geography at worksite 10 and may include, for example, a grading operation, a scraping operation, a leveling operation, a bulk material removal operation, or any other type of geography altering operation at worksite 10.

Machine 12 may embody a mobile machine that performs some type of operation associated with an industry such as mining, construction, farming, or any other industry. For example, machine 12 may be an earth moving machine such as a dozer having a blade or other work implement 18 movable by way of one or more motors or cylinders 20. Machine 12 may also include one more traction devices 22, which may function to steer and/or propel machine 12.

Figure 2:
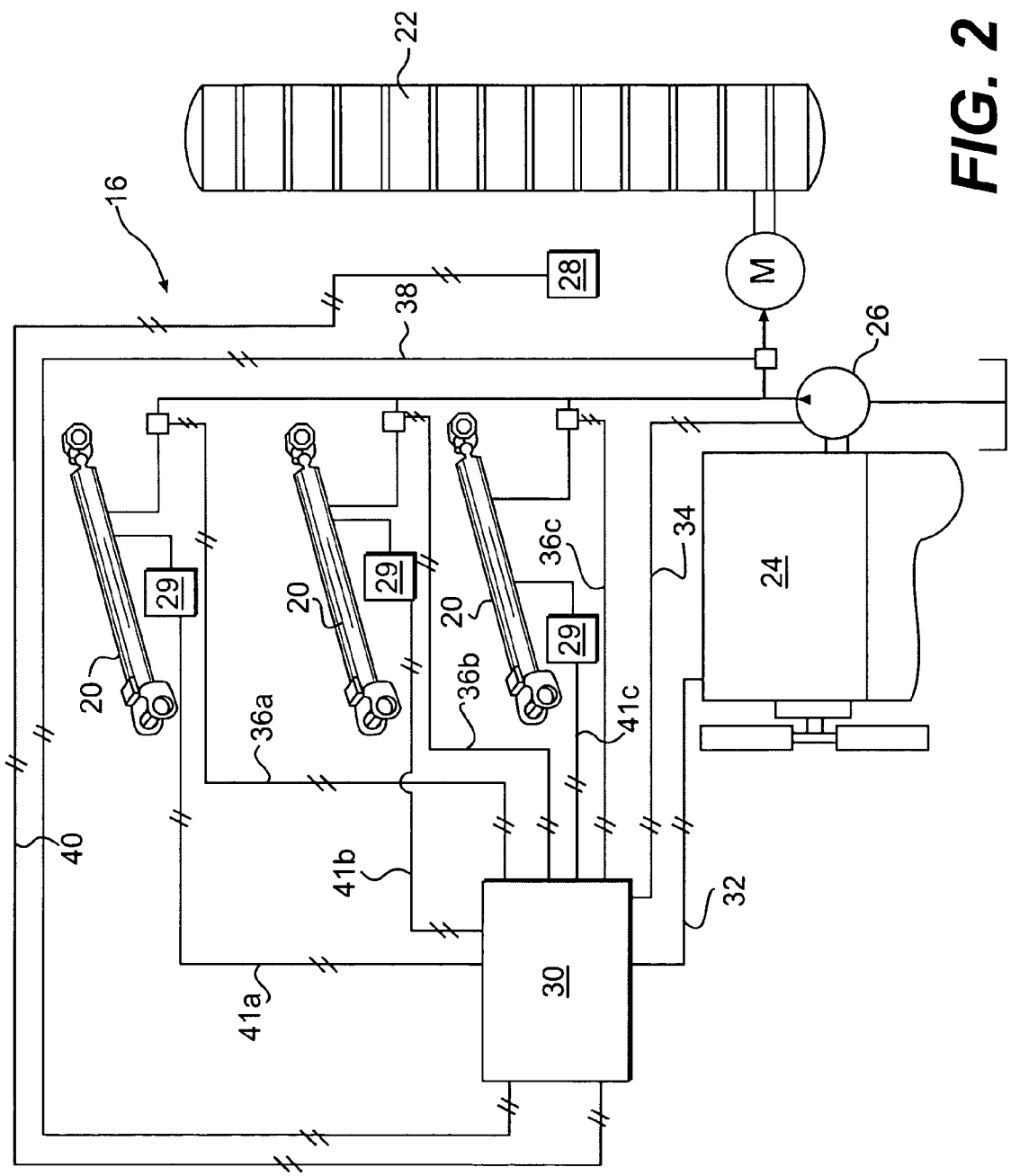
FIG. 2 is a diagrammatic illustration of an exemplary disclosed control system for use with the machine of FIG. 1.

As best illustrated in FIG. 2, machine 12 may include a control system 16 in communication with components of machine 12 to affect the operation of machine 12. In particular, control system 16 may include a power source 24, a means 26 for driving cylinders 20 and traction device 22, a travel speed sensor 28, load sensor 29, and a controller 30. Controller 30 may be in communication with power source 24, driving means 26, cylinders 20, traction device 22, and travel speed sensor 28 via multiple communication links 32, 34, 36a-c, 38, and 40, respectively.

Power source 24 may embody an internal combustion engine such as, for example, a diesel engine, a gasoline engine, a gaseous fuel powered engine, or any other type of engine apparent to one skilled in the art. Power source 24 may alternatively or additionally include a non-combustion source of power such as a fuel cell, a power storage device, an electric motor, or other similar mechanism. Power source 24 may be connected to driving means 26 via a direct mechanical coupling, an electric circuit, or in any other suitable manner.

Driving means 26 may include a pump such as a variable or fixed displacement hydraulic pump drivably connected to power source 24. Driving means 26 may produce a stream of pressurized fluid directed to cylinders 20 and/or to a motor associated with traction device 22 to drive the motion thereof. Alternatively or additionally, driving means 26 could include a generator configured to produce an electrical current used to drive any one or all of cylinders 20 and traction device 22, a mechanical transmission device, or any other appropriate means known in the art.

Speed sensor 28 may be associated with machine 12 to determine a travel speed of machine 12 relative to the work site 10. For example, speed sensor 28 may embody an electronic receiver configured to communicate with one or more satellites (not shown) or a local radio or laser transmitting system to determine a relative location and speed of itself. Speed sensor 28 may receive and analyze high-frequency, low power radio or laser signals from multiple locations to triangulate a relative 3-D position and speed. Speed sensor 28 may also include a ground-sensing radar system to determine the travel speed of machine 12 relative to the work site 10. Alternatively, speed sensor 28 may embody an Inertial Reference Unit (IRU) or a position sensor associated with traction device 22, or any other known locating and speed sensing device operable to receive or determine positional information associated with machine 12. A signal indicative of this position and speed may then be communicated from speed sensor 28 to controller 30 via communication link 40.

Load sensor 29 may measure external loads applied to the work implement 18. In particular, load sensor 29 may measure load data such as hydraulic pressure or electrical current data and relay the load data to controller 30 via communication link 41a, 41b, or 41c. Load sensor 29 may embody, for example, a strain gauge associated with the work implement 18.

Controller 30 may include means for monitoring, recording, storing, indexing, processing, determining, and/or communicating the location and speed of machine 12, the load on cylinders 20, and the productivity of machine 12 and for automatically controlling operations of machine 12 in response to a maximum productivity. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 30 may determine productivity based on one or more inputs associated with the operational characteristics of machine 12. Specifically, productivity may be a function of the load measured by load sensors 29 and speed measured by speed sensor 28. Productivity may be a measure of, for example, the amount of material that work machine 12 moves in a given interval of time (i.e., volume per time). Alternatively, productivity may be a measure of forces (i.e., power to the ground) with respect to work implement 18 position and speed. It is also contemplated that the productivity may be determined by other methods of calculating or approximating the work performed by the machine 12 within a time period.

Controller 30 may record and/or compare data relating to the productivity of machine 12 at different machine speeds. In this way, controller 30 may further determine a change in productivity with respect to the speed of machine 12. To maximize an instantaneous productivity of machine 12, controller 30 may evaluate the time derivative of the productivity and determine a point of maximum productivity. The point of maximum productivity may indicate a speed at which machine 12 may move the maximum amount of material given the current mechanical and terrain characteristics. Since the data used to determine productivity may be created and stored by controller 30 on the fly and continuously or periodically updated according to various input parameters from speed sensor 28, load sensor 29, and any other available input device, the determination of maximum productivity may not be limited to a single machine 12, a single work implement 18 configuration, or a single type of worksite 10. Controller 30 and the associated automated excavation control may be utilized with different types of machine 12, different work implement 18 configurations and different worksites 10, each time creating a job-specific productivity map and maximizing instantaneous productivity based on that map.

Figure 3:
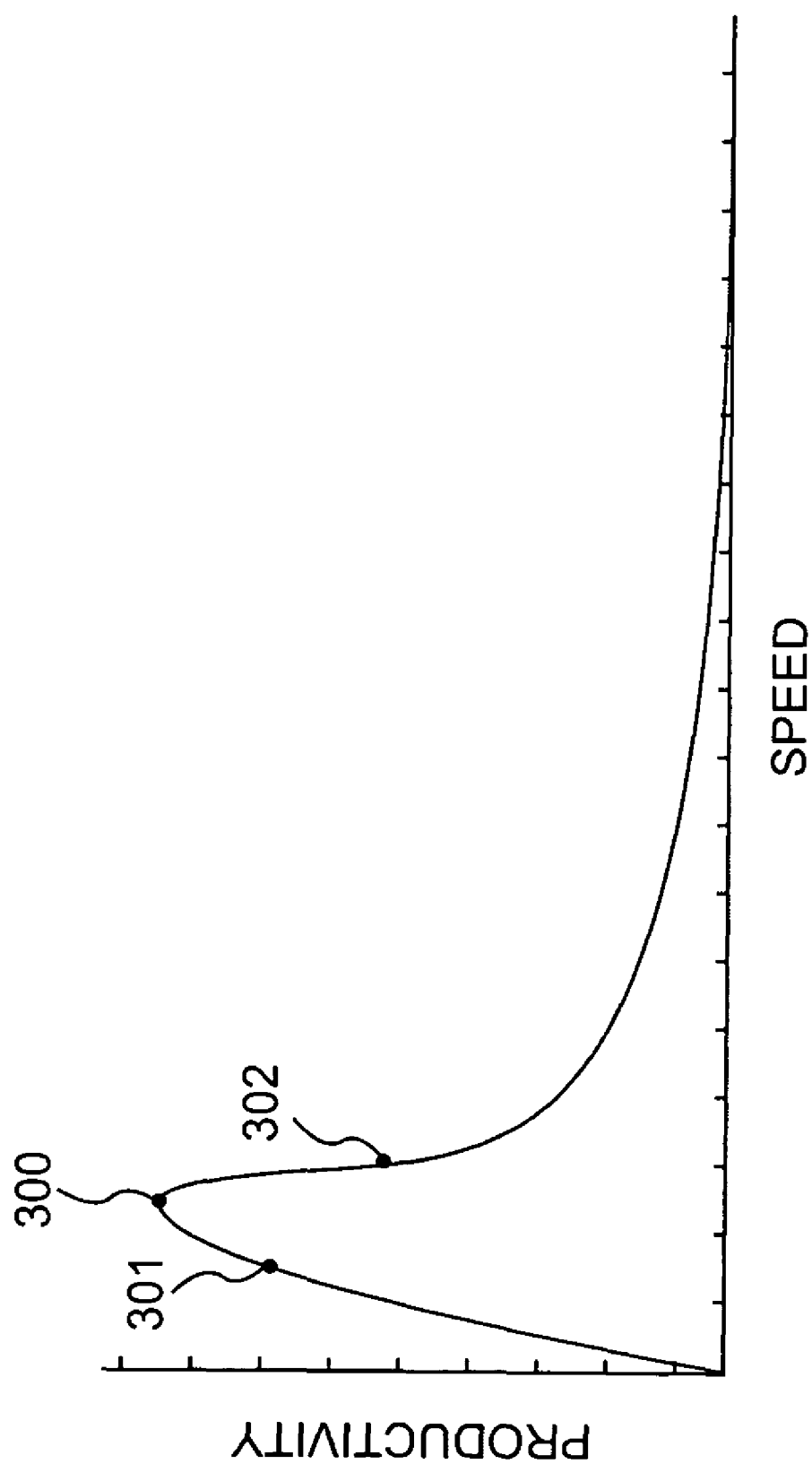
FIG. 3 is a graph of travel speed of the machine of FIG. 1 versus productivity.

FIG. 3 illustrates an exemplary curve of machine speed versus the productivity of machine 12. At low speeds, machine 12 may be operating suboptimally (relative to productivity) because of the extra time needed to complete a given task at a low speed. Point 301 of FIG. 3 may depict such a suboptimal productivity due to low speed. Even though the machine may be able to lower work implement 18 to a blade depth deeper than what may be possible at higher speeds (i.e., may move more material in a single pass), the increased volume of moved material may still be insufficient to compensate for the slower speed and a less than maximum productivity may be obtained. Further, at excessive speeds, machine 12 may operate suboptimally because the blade depth of work implement 18 may be quite shallow (i.e. the volume of material moved in a single pass may be little) such that the power produced by the machine 12 may be directed to maintain the high speeds. Point 302 of FIG. 3 may depict such a suboptimal productivity due to excessive speed. Though the machine may be operating at a high speed, many trips across or through worksite 10 may be required to move the desired amount of material. The higher speed may be insufficient to compensate for the shallow blade depth of work implement 18, and a less than maximum productivity may be obtained. Point 300 of FIG. 3 may depict a maximum attainable productivity for a given machine 12 and work implement 18 configuration. This point 300 may depict a most productive combination of load and travel speed.

Controller 30 may control cylinders 20 and/or traction devices 22 to automatically alter the geography of worksite 10. In particular, controller 30 may automatically control operations of machine 12 to engage work implement 18 with the terrain of worksite 10. Controller 30 may be in communication with the actuation components of cylinders 20 to raise, lower, or maintain the position of work implement 18. Controller 30 may further be in communication with traction device 22 to raise, lower, or maintain the current speed of machine 12. In this manner, controller 30 may provide for partial or full automatic control of machine 12.

Controller 30 may control cylinder 20 to achieve maximum productivity. Specifically, controller 30 may increase the depth of work implement 18 to slow the machine 12 or decrease the depth of work implement 18 to increase the speed of machine 12. Controller 30 may manipulate the depth of work implement 18 to find the optimal operational condition where the rate of change of productivity with respect to machine speed is zero. It is contemplated that controller 30 may alternatively only determine whether the machine 12 is currently operating at a maximum productivity, and then relinquish control of machine 12 to an operator with information regarding the productivity, if desired.

Figure 4:
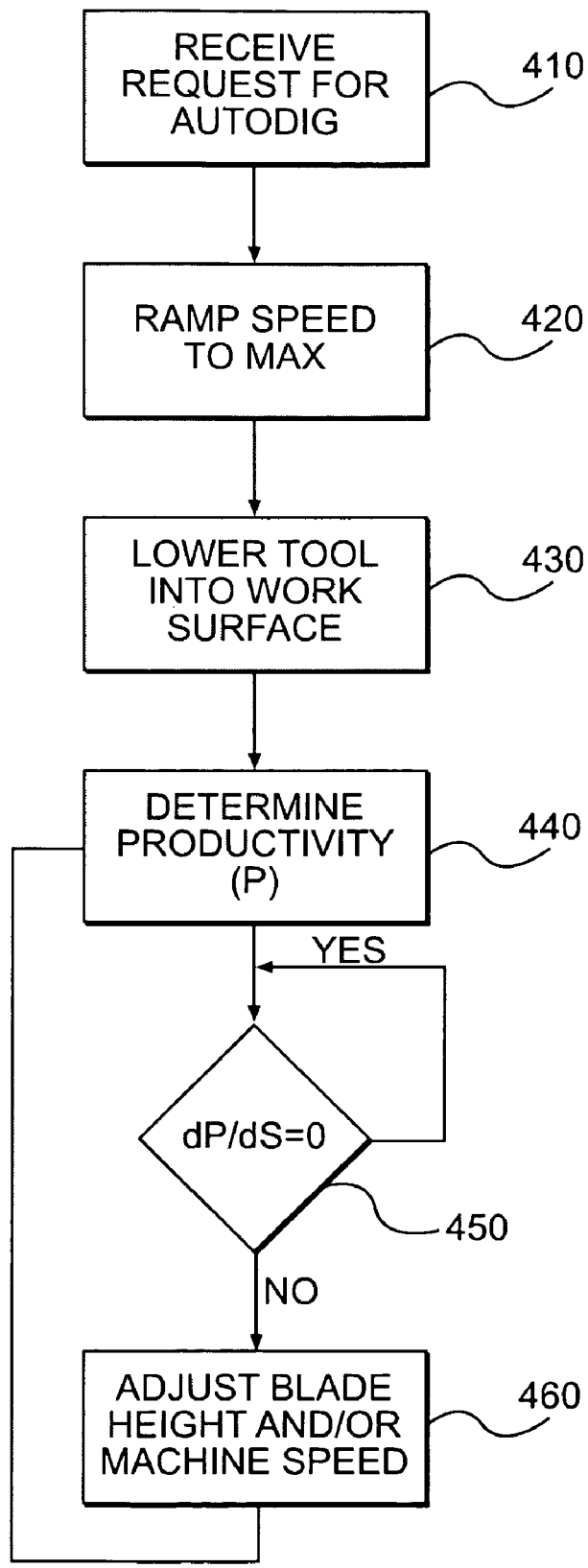
FIG. 4 is a flowchart depicting an exemplary method performed by the control system of FIG. 2.

FIG. 4 is flow chart depicting an exemplary method performed by the control system of FIG. 2. FIG. 4 will be discussed in more detail in the following section to further illustrate the disclosed control system and its operation.

INDUSTRIAL APPLICABILITY

The disclosed control system may be applicable to machines performing material moving operations where productivity is important. In particular, the disclosed control system may determine a machine's current productivity and automatically control an operating condition (such as blade height) to maximize removal of earthen material in a minimum amount of time. Because the control system may only be based on currently determined productivity, the control system may be applicable to nearly any machine 12 in any condition with any configuration of work implement 18 operating at any worksite 10. The operation of control system 16 will now be described.

FIG. 4 illustrates the operation of control system 16. Controller 30 may receive a request to begin an automatic digging (autodig) function (step 410). This request may be made by the operator currently in control of the machine. The request may be made via a single switch (not shown). It is contemplated that the single switch may trigger a series of machine 12 events simultaneously or in a predetermined sequence. For example, operator manipulation of the single switch may begin an autodig function, which will be described in detail below. Further, the single switch may be programmed to allow controller 30 to automate complicated sequences of machine 12 events, such as downshifting, upshifting, or changing machine direction while simultaneously lowering or raising work implement 18. It is also contemplated that the request to begin an autodig function may be initiated using any other method known in the art for communicating a request to controller 30.

Upon receiving a request to initiate the autodig function, controller 30 may increase the speed of machine 12 to a maximum speed (step 420). The maximum speed may be a limit of the machine 12 or may, alternatively, be a limit set by an operator. Controller 30 may increase machine travel speed by regulating the output of driving means 26 and/or power source 24. Once this maximum speed is attained, controller 30 may lower work implement 18 of machine 12 into the work surface (step 430). Work implement 18 may be moved by regulating, for example, a pressure of fluid supplied to cylinders 20. Once work implement 18 engages worksite 10, the maximum speed of machine 12 will begin to decrease as a result of the increasing load on cylinders 20 and machine 12. In fact, there may exist a point at which machine 12 stops (i.e., completely stalls) due to an excessive load. Similarly, as work implement 18 is retracted from worksite 10, machine 12 may increase speed due to a decreasing load on cylinders 20. As the work implement 18 is completely retracted and blade depth is zero, machine 12 may return to the maximum speed attained before work implement 18 engaged worksite 10. At a point between the maximum ground speed and the stalled condition, the work implement may attain a maximum productivity depth. This depth may indicate a situation where the greatest amount of material is being removed in the least amount of time. From this work implement 18 depth, an increase or decrease in depth may result in less productivity (i.e. the slope of the productivity versus speed is zero). Further, the maximum productivity depth of work implement 18 may be unique to machine 12, the configuration and condition of work implement 18, and current worksite 10 conditions.

As machine 12 is maintaining a positive speed and load sensors 29 detect a load on the work implement 18 of machine 12, controller 30 may continuously monitor one or more inputs from speed sensor 28 and load sensor 29 to determine an instantaneous productivity of machine 10 with respect to the current speed of machine 10 (step 440). If controller 30 determines that the current rate of change of productivity with respect to the current speed is nonzero (i.e. increasing or decreasing) or exceeds zero by a certain amount (step 450; no), then controller 30 may continue to manipulate tool depth and, subsequently the machine speed, to maximize productivity (step 460) while continuously determining the instantaneous productivity of machine 12 (step 440). For example, when the current rate of change of productivity is nonzero and an increase in work implement 18 depth will increase productivity even though machine speed may decrease, controller 30 may regulate work implement 18 to an increased depth. Likewise, if the current rate of change of productivity is nonzero and a decrease of work implement 18 depth will increase productivity even though less material may be moved in a single pass, controller 30 may regulate work implement 18 to a decreased depth.

When controller 30 determines that the current rate of change of productivity with respect to the current speed is about zero (i.e., machine 12 has reached a maximum attainable productivity and any change in tool depth results in less productivity) (step 450; yes), then controller 30 may maintain the current depth of work implement 18, while continuously monitoring the rate of change of productivity (step 440). If, at some future time, controller 30 determines that the rate of change of productivity with respect to the current speed is no longer about zero (step 450; no) (i.e., no longer at a maximum productivity), then controller 30 once again may manipulate work implement 18 depth and, indirectly, machine speed (step 460), while continuing to monitor the rate of change of productivity (step 440).

Alternatively, it is contemplated that instead of always creating and updating a curve similar to FIG. 4, controller 30 may create a curve similar to FIG. 4 and, from that created curve, determine a target speed which may cause machine 12 to operate at a maximum productivity given the current machine and terrain characteristics. Controller 30 may then manipulate cylinders 20 and work implement 18 to obtain that target speed, without continuously updating and creating a new productivity curve similar to FIG. 4. The curve similar to FIG. 4 produced by controller 30 may be stored temporarily in the memory of controller 30 and periodically updated (i.e., every day), or it may be updated in response to a change in configuration of machine 12 or worksite 10 (i.e., changing work implement 18). Alternatively, the curve created by controller 30 may be updated only upon request from the operator of machine 12.

Because controller 30 may be used with a variety of machines and work implement configurations, it's accuracy may be substantially unaffected by a change in the machine, work implement configuration, or capacity. Also, because controller 30 may be independent of machine, or limited to pre-programmed specific control maps, it may be applicable to and utilized in other machines or work implement configurations having a different output capacity, and to an older machine with diminished capacity.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for a mobile excavation machine, comprising:
   a ground engaging work tool;
   a sensor configured to sense a parameter indicative of a current travel speed of the mobile excavation machine and to generate a speed signal in response thereto; and
   a controller in communication with the ground engaging work tool and the sensor, the controller being configured to:
      receive an operator input indicative of a desired autonomous dig function;
      increase the travel speed to a maximum amount and engage the ground engaging tool with a work surface in response to the operator input;
      receive the speed signal from the sensor;
      determine an amount of material currently being moved by the work tool;
      calculate a current productivity value associated with removal of the material based on the speed signal and the determined amount of material currently being moved; and
      control the ground engaging work tool to vary the amount of material currently being moved in response to the current productivity value.

2. The control system of claim 1, further including a load sensor configured to generate a load signal indicative of the amount of material being removed, wherein the controller determines the amount of material currently being moved based on the load signal.

3. The control system of claim 2, wherein the load sensor includes a strain gauge associated with the ground engaging work tool.

4. The control system of claim 1, wherein the controller is further configured to determine a rate of change of the current productivity value with respect to travel speed.

5. The control system of claim 4, wherein the controller controls the ground engaging work tool to vary the amount of material moved when the rate of change is greater than a predetermined amount from a desired rate of change.

6. The control system of claim 5, wherein the desired rate of change is zero.

7. The control system of claim 1, wherein the amount of material removed is varied by automatically changing a depth of cut produced by the ground engaging work tool.

8. The control system of claim 7, wherein the travel speed varies as a result of changing the depth of cut.

9. The control system of claim 8, wherein the travel speed decreases as the depth of cut increases, and the controller is configured to increase the depth of cut until a rate of change of the productivity value relative to travel speed is within a predetermined amount of zero.

10. The control system of claim 1, wherein the controller is further configured to:
    determine a target speed associated with maximizing the current productivity value;
    control the ground engaging work tool to vary the travel speed in response to the determined target speed.

11. A method of controlling machine operation, comprising:
    receiving an operator input indicative of a desired autonomous dig function;
    automatically increasing the current machine travel speed to a maximum amount in response to receiving operator input;
    determining a current machine travel speed;
    determining an amount of material currently being excavated;
    calculating a current productivity value based on the current travel speed and the determined amount of material currently being excavated; and
    varying the amount of material currently being excavated in response to the current productivity value.

12. The method of claim 11, further including:
    initiating excavation in response to the operator input.

13. The method of claim 12, wherein the amount of material currently being excavated is varied by changing a depth of excavation.

14. The method of claim 13, wherein the current machine travel speed dependently varies as a result of changing the depth of excavation.

15. The method of claim 14, wherein the current machine travel speed decreases as the depth of excavation increases, and the method further includes increasing the depth of cut until the productivity value reaches a maximum.

16. The method of claim 14, wherein the current machine travel speed decreases as the depth of excavation increases, and the method further includes increasing the depth of excavation until a rate of change of the productivity value relative to the current machine travel speed is within a predetermined amount of zero.

17. A mobile excavation machine, comprising:
    a power source configured to generate a power output;
    a traction device configured to receive the power output and propel the mobile excavation machine;
    a ground engaging work tool driven by the power source to move into and out of a work surface;
    a sensor configured to sense a parameter indicative of a travel speed of the mobile excavation machine and to generate a signal in response thereto;
    a load sensor configured to sense a parameter indicative of a current amount of material being excavated; and
    a controller in communication with the ground engaging work tool, the speed sensor, and the load sensor, the controller being configured to:
       receive an operator input indicative of a desired autonomous dig function;
       increase the travel speed to a maximum amount and engage the ground engaging tool with a work surface in response to the operator input;
       calculate a current productivity value associated with removal of the material based on the speed signal and the load signal; and
       control the ground engaging work tool to vary the amount of material currently being moved in response to the current productivity value.

18. The mobile excavation machine of claim 17, wherein the controller is further configured to:
    increase the depth of cut until the productivity value reaches a maximum.

19. The control system of claim 1, wherein the current productivity value is a measure of a volume per unit time of material moved by the work tool.

20. The mobile excavation machine of claim 17, wherein the current productivity value is a measure of a volume per unit time of material moved by the work tool.

* * * * *